US011629264B2

(12) United States Patent
Milos-Schouwink (10) Patent No.: US 11,629,264 B2
(45) Date of Patent: Apr. 18, 2023

(54) THERMOLUMINESCENT AND SUPERPARAMAGNETIC COMPOSITE PARTICLE AND MARKING COMPRISING SAME

(71) Applicant: SICPA HOLDING SA, Prilly (CH)

(72) Inventor: Mia Milos-Schouwink, Vevey (CH)

(73) Assignee: SICPA HOLDING SA, Prilly (CH)

( * ) Notice: Subject to any disclaimer, the term of this patent is extended or adjusted under 35 U.S.C. 154(b) by 314 days.

(21) Appl. No.: 15/737,550

(22) PCT Filed: Jun. 15, 2016

(86) PCT No.: PCT/EP2016/063762
§ 371 (c)(1),
(2) Date: Dec. 18, 2017

(87) PCT Pub. No.: WO2016/202862
PCT Pub. Date: Dec. 22, 2016

(65) Prior Publication Data
US 2018/0155564 A1 Jun. 7, 2018

(30) Foreign Application Priority Data

Jun. 15, 2016 (WO) ................ PCT/EP2016/063762

(51) Int. Cl.
*G07D 7/00* (2016.01)
*C09D 11/50* (2014.01)
(Continued)

(52) U.S. Cl.
CPC ................ *C09D 11/50* (2013.01); *B41J 2/01* (2013.01); *C09D 11/037* (2013.01);
(Continued)

(58) Field of Classification Search
None
See application file for complete search history.

(56) References Cited

U.S. PATENT DOCUMENTS 5,683,179 A * 11/1997 Lowry ................... G01K 11/20
374/161
2003/0215825 A1* 11/2003 Tong .................... C12Q 1/6816
435/6.11
(Continued)

FOREIGN PATENT DOCUMENTS

CN      102446451      5/2012
WO      1986003768      7/1986
(Continued)

OTHER PUBLICATIONS

Yinhai et al. "Persistent Luminescence and photocatalytic properties of Ga2O3:Cr3+, Zn2+ phosphors" ScienceDirect, Optical Materials 36 (2014) p. 1798-1801. (Year: 2014).*
(Continued)

*Primary Examiner* — David P Porta
*Assistant Examiner* — Mamadou Faye
(74) *Attorney, Agent, or Firm* — Muncy, Geissler, Olds & Lowe, P.C.

(57) ABSTRACT

Disclosed is a composite particle for use in a marking that is suitable for identification/authentication purposes. The particle comprises at least one superparamagnetic portion and at least one thermoluminescent portion coated with an thermoisolating portion. Optionally also a thermoconductive portion between the superparamagnetic and thermoluminscent portions.

19 Claims, 7 Drawing Sheets

(51) Int. Cl.

| | | |
|---|---|---|
| *C09K 11/77* | (2006.01) | |
| *C09K 9/00* | (2006.01) | |
| *C09K 11/02* | (2006.01) | |
| *C09K 11/68* | (2006.01) | |
| *B41J 2/01* | (2006.01) | |
| *C09D 11/037* | (2014.01) | |
| *C09D 11/322* | (2014.01) | |
| *C09K 5/14* | (2006.01) | |
| *G01N 21/63* | (2006.01) | |
| *G01N 21/66* | (2006.01) | |
| *G01N 21/71* | (2006.01) | |
| *B42D 25/378* | (2014.01) | |
| *G07D 7/15* | (2016.01) | |
| *G07D 7/121* | (2016.01) | |

(52) U.S. Cl.
 CPC .............. *C09D 11/322* (2013.01); *C09K 5/14* (2013.01); *C09K 9/00* (2013.01); *C09K 11/02* (2013.01); *C09K 11/025* (2013.01); *C09K 11/681* (2013.01); *C09K 11/7746* (2013.01); *G01N 21/63* (2013.01); *G01N 21/66* (2013.01); *G01N 21/71* (2013.01); *B42D 25/378* (2014.10); *G07D 7/003* (2017.05); *G07D 7/121* (2013.01); *G07D 7/15* (2017.05)

(56) References Cited

U.S. PATENT DOCUMENTS

| | | | | |
|---|---|---|---|---|
| 2004/0101822 | A1* | 5/2004 | Wiesner ................ | B82Y 30/00 435/5 |
| 2005/0120917 | A1* | 6/2005 | Ruger ................... | C09C 1/0015 106/415 |
| 2005/0218782 | A1* | 10/2005 | Ooshima ............... | H01J 29/20 313/486 |
| 2008/0038494 | A1* | 2/2008 | Midgley ............... | C09K 11/574 428/34.1 |
| 2008/0248255 | A1* | 10/2008 | Argoitia ................ | C09D 5/29 428/168 |
| 2009/0007815 | A1* | 1/2009 | Hampden-Smith ...... | G07D 7/06 106/31.13 |
| 2010/0072739 | A1* | 3/2010 | Kuntz ................... | B42D 25/00 283/70 |
| 2010/0224831 | A1 | 9/2010 | Woo et al. | |
| 2010/0295287 | A1* | 11/2010 | Reichert ............... | C09B 67/009 283/70 |
| 2012/0080878 | A1* | 4/2012 | Kecht .................... | B41M 3/14 283/85 |
| 2014/0291495 | A1* | 10/2014 | Fischer ................ | C09K 11/02 250/216 |

FOREIGN PATENT DOCUMENTS

| | | |
|---|---|---|
| WO | 2007036682 | 4/2007 |
| WO | 2014072172 | 5/2014 |
| WO | 2015091745 | 6/2015 |

OTHER PUBLICATIONS

International Search Report and Written Opinion issued with respect to application No. PCT/EP2016/063732.

Lodhia et al. Development and use of iron oxide nanoparticles (Part I): Synthesis of iron oxide nanoparticles for MRI. Biomedical Imaging and Intervention Journal, 6(2):e12, 2010, 11 pages.

Hiroaki Mamiya, Recent Advances in Understanding Magnetic Nanoparticles in AC Magnetic Fields and Optimal Design for Targeted Hyperthermia, Journal of Nanomaterials, 2013, Article ID 752973, 17 pages.

Reju Thomas and al., Magnetic Iron Oxide Nanoparticles for Multimodal Imaging and Therapy of Cancer, International Journal of Molecular Sciences, 2013, 14, 15910-15930.

Usawadee Sakulkhu, Preparation of coated nanoparticles and investigation of their behavior in biological environment, These n°5694 (2013) EPFL, 189 pages.

Chastellain, M., Petri, A. & Hofmann, H. Particle size investigations of a multistep synthesis of PVA coated superparamagnetic nanoparticles, Journal of Colloid and Interface Science 278, 353-360 (2004).

Petri-Fink, A., Chastellain, M., Juillerat-Jeanneret, L., Ferrari, A. & Hofmann, H., Development of functionalized superparamagnetic iron oxide nanoparticles for interaction with human cancer cells, Biomaterials 26, pp. 2685-2694 (2005).

Wei Li and Dongyuan Zhao, Extension of the Stober Method to Construct Mesoporous Si02 and Ti02 Shells for Uniform Multifunctional Core-Shell Structures, Advanced Materials, 2013, 25, 142-149.

C. Chang, Z. Yuan and D. Mao., Eu2+ activated long persistent strontium aluminate nano scaled phosphor prepared by precipitation method, Journal of Alloys and Compounds 415, (2006), 220-224.

LL. Noto, et al., Afterglow enhancement with In 3+ codoping in CaTi03 :Pr3+ red phosphor, Powder Technology, 237, 2013, 141-146.

RuiChen, Enhanced luminescence properties of CaTi03 :Pr3+ phosphor with addition of Si02 by solid-state reaction, Spectrochimica Acta Part A: Molecular and Biomolecular Spectroscopy 127, 2014, 256-260.

Koen Van den Eeckhout, et al., Persistent Luminescence in Non-Eu2+-Doped Compounds: A Review, Materials 2010, 3, 2536-2566.

Koen Van den Eeckhout, et al., Persistent Luminescence in Eu2+-Doped Compounds: A Review, Materials 2013, 6, 2789-2818.

Yi-Ying Lu et al., Long-lasting near-infrared persistent luminescence from -GaO: Crnanowire assemblies, Journal of Luminescence, Elsevier BV North-Holland, NL, vol. 131, No. 12, Jul. 4, 2011 (Jul. 4, 2011), pp. 2784-2787, XP028257352, ISSN: 0022-2313.

Zuoqiu Liang et al., Enhancement of green long lasting phosphorescence in CaSn03:Tb3+ by addition of alkali ions, Physica B: Condensed Matter, vol. 412, Dec. 20, 2012 (Dec. 20, 2012), pp. 36-40, XP055133148, ISSN: 0921-4526.

Chinese Office Action in counterpart Chinese Application No. 201680035307.2 dated Sep. 4, 2019 (and English language translation of the Office Action).

Japanese Office Action (Notice of Reasons for Rejection) in counterpart Japanese Application No. 2017-559675 dated Mar. 10, 2020 (and English language translation of the Office Action), 12 pages.

\* cited by examiner

Measurement Scheme:
1. UV loading of TL
2. Measure luminescence intensity
3. Apply magnetic field for a certain time
4. Measure luminescence intensity during that time

THERMOLUMINESCENT AND SUPERPARAMAGNETIC COMPOSITE PARTICLE AND MARKING COMPRISING SAME

BACKGROUND OF THE INVENTION

1. Field of the Invention

The present invention relates to a composite particle which comprises at least one thermoluminescent portion or core which comprises a doped ceramic material and at least one superparamagnetic portion distributed over the surface of the thermoluminescent portion, a marking comprising a plurality of composite particles and to the use of the marking for the identification and/or authentication of an article provided with the marking.

2. Discussion of Background Information

Counterfeiting is no longer a national or a regional problem but a worldwide problem which has an impact not only on manufacturers but also on the consumer. Counterfeiting is a significant problem with goods like clothes and watches but becomes even more serious when it affects medicines and drugs. Each year thousands of people around the world die because of counterfeit drugs. Counterfeiting has also an impact on government revenues in that it affects the collection of taxes for, e.g., cigarettes and alcohol because of the existence of a black market where it is impossible to track and trace counterfeit (smuggled, diverted, etc.) products with no valid tax stamps.

Many solutions have been proposed to make counterfeiting impossible or at least very difficult and/or costly, for example RFID solutions and the use of invisible inks or mono-dimensional code or bi-dimensional code as unique identifier to avoid or at least to limit drastically the existence of fake, diversion and/or counterfeit. Despite the fact that these solutions are useful, also counterfeiters now have access to many advanced technologies that allows them to reproduce or to mimic existing security device which sometimes are presented as unique identifier.

In view of the foregoing, there remains a need to improve the security and avoid faking, diversion or counterfeiting of goods, items or packaging containing valuable products, which must be fulfilled. There also is a need to make sure consumers are provided with genuine products, but very often it also is important in some developing countries to save people from death caused by using fake medicines. There is then a crucial need to be fulfilled to provide unique identifiers useful for authentication, able to provide track and trace information or identification which remains robust and provides tamperproof properties.

SUMMARY OF THE INVENTION

The present invention provides a composite particle for use in a marking. The particle comprises at least one superparamagnetic portion (a) and at least one thermoluminescent portion (b).

Figure 3:
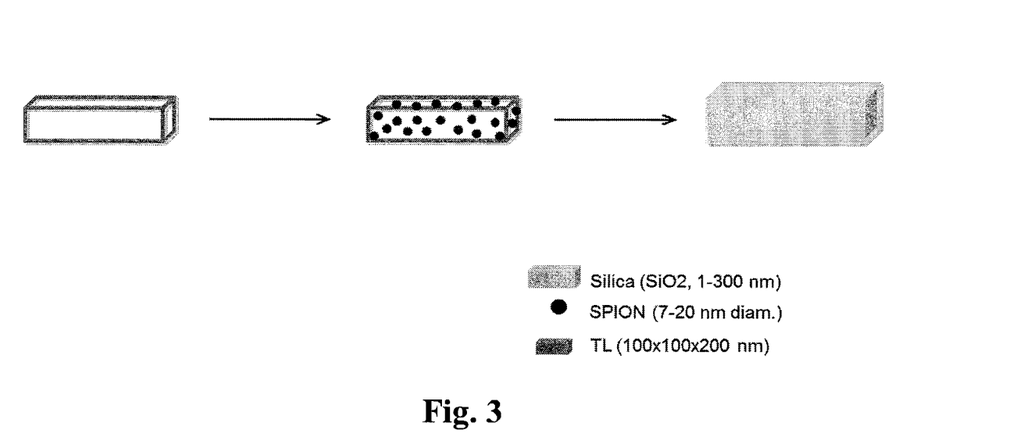
FIG. 3 schematically shows the composite particles where the SPIONs are assembled directly on the surface of the thermoluminescent material, and the total particle is covered with a layer of silica FIG. 4 schematically shows the composite particles where the SPIONs are assembled on silica that is separating SPIONs and the thermoluminescent material with a certain controlled thickness. Then, the total particle is covered with a layer of silica
Figure 4:
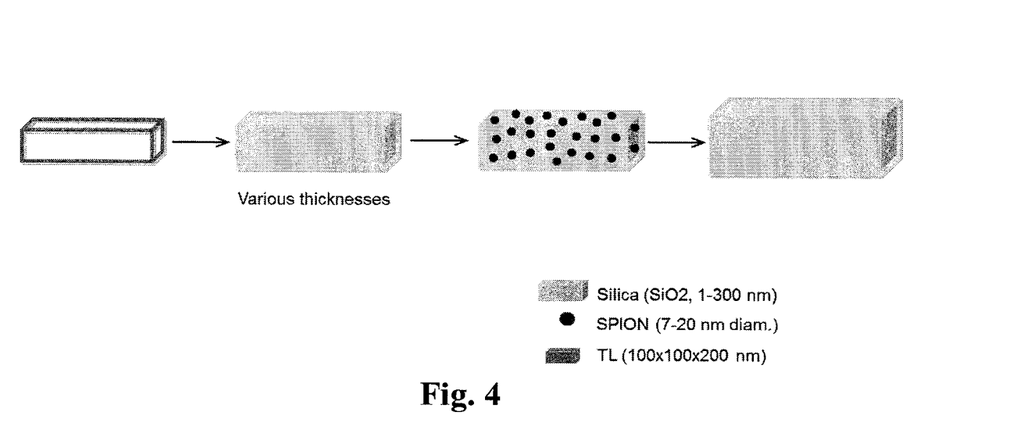
Figure 5:
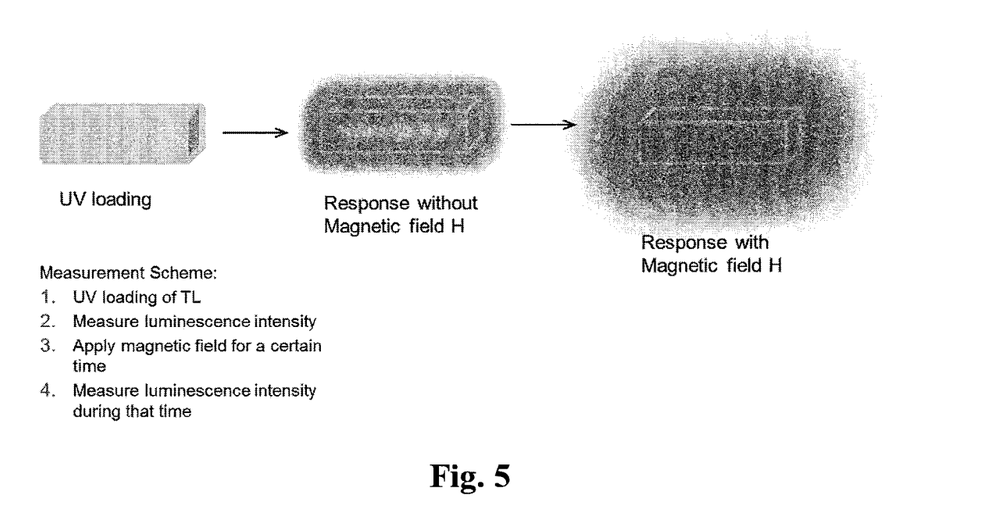
FIG. 5 illustrates the method of authentication based on luminescence intensity variation upon an applied oscillating magnetic field after the preliminary UV loading
Figure 6:
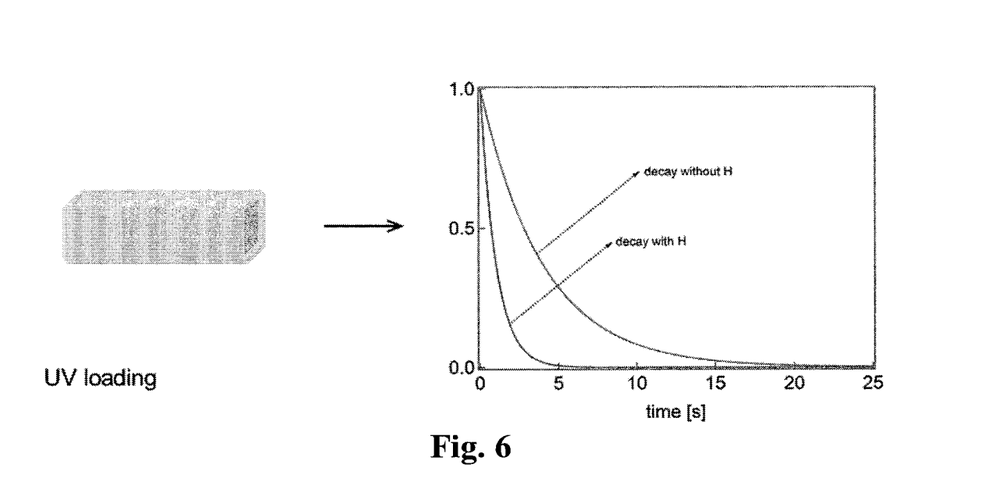
FIG. 6 illustrates the method of authentication based on a decay variation upon an applied oscillating magnetic field after the preliminary UV loading

The composite particle comprise a thermoluminescent material (b) that is at least partially covered by (a) a superparamagnetic material in the form of aggregated or many single particles distributed over the surface of the thermoluminescent material (FIG. 3 and FIG. 4). Partially as used according to the invention, means are preferably surrounded by at more than 0.1% of the surface of the thermoluminescent materials by the superparamagnetic material. Preferably, the composite particle made by the thermoluminescent material and partially covered by a superparamagnetic material is coated with a final layer of silica.

In one aspect of the particle, the thermoluminescent portion thereof may comprise (or consist of) a doped ceramic material.

In another aspect, the thermoluminescent material may be made of aggregated thermoluminescent particles comprising (or consisting of) a ceramic material doped with one or more ions selected from transition metal ions and rare earth metal ions.

In yet another aspect, the superparamagnetic material of the composite particle may comprise (or consist of) $Fe_3O_4$ and/or the ceramic material may comprise at least one metal and at least one element selected from O, N, S, and P. For example, the ceramic material may comprise at least O and/or S.

In a still further aspect of the composite particle of the present invention, the ceramic material may comprise $Ga_2O_3$ and/or the one or more doping ions may comprise at least one ion selected from the rare earth metal ions, for example, one or more of $Eu^{2+}$, $Eu^{3+}$, $Dy^{3+}$, $Pr^{3+}$, $Sm^{3+}$, $T^{3+}$, $Ce^{3+}$, $Ce^{2+}$, $Dy^{3+}$, $Er^{3+}$ and $Tm^{3+}$.

In a still further aspect of the composite particle of the present invention, the ceramic material may comprise $CaTiO_3$ and one doping ion may comprise $Pr^{3+}$, and the other doping ion may comprise $In^{3+}$.

In a still further aspect of the composite particle of the present invention, the concentrations of doping ions $Pr^{3+}$ and $In^{3+}$ in $CaTiO_3$ varies from 0% to 10%, as compared to $Ca^{2+}$, more preferably between 0.05% and 2%, even more preferably 0.14% for $Pr^{3+}$ and 1% for $In^{3+}$.

In another aspect, the one or more doping ions may comprise at least two rare earth metal ions and/or at least one doping ion may be selected from a metal or a transition metal ion such as $Cr^{3+}$, $Cu^{2+}$, $In^{3+}$, $Mn^{2+}$ and $Ti^{3+}$.

In another aspect of the composite particle, the largest dimension of the thermoluminescent material or core may be from 30 nm to 100 µm, e.g., from 100 nm to 1 µm, more preferably from 150 nm to 500 nm and the largest dimension (e.g., diameter in the case of a spherical particle) of the superparamagnetic particle may be from 5 nm to 20 nm, e.g., from 7 nm to 17 nm.

In another aspect, the composite particle of the present invention may further comprise a thermoconductive material that separates the thermoluminescent material or core thereof from the superparamagnetic material. Preferably, said thermoconductive material is thermoisolating material with a very low thermal conductivity. For example, the thermoconductive material may be arranged as a layer or connector between the superparamagnetic portion and the thermoluminescent portion of a composite particle and/or may comprise one or more materials which (1) are thermoconductive, (2) do not interfere with the interaction between an external magnetic field and the superparamagnetic material, (3) are optically transparent for radiation in the UV-Vis and NIR ranges and preferably, (4) can readily be synthesized by processes such the sol-gel process, such as, e.g., $SiO_2$, $TiO_2$, and polymethylmethacrylate, in particular $SiO_2$. The thermoconductive material (layer) may, for example, have a thickness of from 5 nm to 600 nm, e.g., from 5 nm to 600 nm, preferably from 7 nm to 300 nm, more preferably from 10 nm to 200 nm, even more preferably from 10 nm to 100 nm, even more preferably from 10 nm to 50 nm The present invention also provides a plurality of composite particles as set forth above (including the various aspects thereof). For example, the plurality of composite particles may comprise at least two composite particles which differ with respect to at least one of the superparamagnetic portion, the thermoluminescent portion or core such as the doped ceramic material and, optionally, the thermoconductive material and/or may comprise at least two composite particles which differ with respect to the size and/or percentage of the superparamagnetic portion or the size and/or the chemical nature of the thermoluminescent portion and/or with respect to the thickness of the (e.g., layer of) thermoconductive material and/or may exhibit at least two different particle size distributions. In addition to this, the final composite particles are preferably coated with a layer of thermoconductive, preferably thermoisolating material for example silica.

The present invention also provides a marking which comprises a plurality of composite particles as set forth above. For example, the marking may be in the form of at least one of an image, a picture, a logo, indicia, a cloud of dots, randomly distributed dots, one or more glyphs and a pattern representing a code selected from one or more of a 1-dimensional barcode, a stacked 1-dimensional barcode, a 2-dimensional barcode, a 3-dimensional barcode, and a data matrix.

The present invention also provides an article that has thereon the marking of the present invention as set forth above. For example, the article may be or may comprise at least one of a label, packaging, a cartridge, a container or a capsule that contains foodstuffs, nutraceuticals, pharmaceuticals or a beverage, a banknote, a credit card, a stamp, a tax label, a security document, a passport, an identity card, a driver's license, an access card, a transportation ticket, an event ticket, a voucher, an ink-transfer film, a reflective film, an aluminum foil, and a commercial good.

The present invention also provides an ink for providing an article with a marking. The ink comprises a plurality of composite particles according to the present invention as set forth above and a carrier for the composite particles.

The present invention also provides a method of providing an article with a marking. The method comprises using the ink of the present invention as set forth above for providing the marking.

The present invention also provides a method of identifying and/or authenticating an article that is provided with a marking according to the present invention as set forth above. The method comprises the following steps:
(i) irradiating the marking with (preferably electromagnetic) radiation to cause the composite particles to re-emit some of the irradiated energy in the form of radiation (at a wavelength that is characteristic for the thermoluminescent portion);
(ii) subjecting the irradiated marking to an oscillating magnetic field of predetermined strength and frequency for a predetermined period of time to cause the superparamagnetic material to heat up; and
(iii) detecting the intensity of the thermoluminescence emitted by the marking at a predetermined wavelengths range during the predetermined period of time of step (ii) to obtain the variation of the intensity of the thermoluminescence as a function of time
(iv) optionally after step (iii) pursuing the detection of the luminescence intensity after the magnetic field is switched off.
(v) Optionally, the UV light can be turned off prior (ii) subjecting the irradiated marking to an oscillating magnetic field Wavelengths range means wavelength interval whereby the intensity of the thermoluminescence emitted by the marking is detected. Standard silicon photodiodes are used to detected different wavelengths ranges.

In one aspect, the method may further comprise:
comparing the variation of the intensity of thermoluminescence obtained in step (iii) with the variation of the intensity of the thermoluminescence of composite particles used for making the marking (i.e., a reference sample) that had previously been determined under conditions identical to those used in steps (i) and (ii).

In another aspect, the method may also consist of detecting the decay of the luminescence emitted by the marking at a predetermined wavelengths range after step (i) and after step (ii) and comparing their decay constants.

In another aspect of the method, the radiation used in step (i) may be in the UV or visible range and/or the wavelength of the radiation re-emitted in step (i) may be in the visible range or the Near Infrared (NIR) range.

In yet another aspect, the method may further comprise the determination of the intensity of the radiation re-emitted in step (i). For example, the intensity of the radiation re-emitted in step (i) may be compared to the intensity of the radiation emitted by the composite particles used in the marking (i.e., a reference sample) which had previously been determined under identical conditions.

The present invention also provides an apparatus for carrying out the method of the present invention as set forth above. The apparatus comprises (1) a radiation source (e.g., a UV lamp or a lamp that emits radiation in the visible wavelength range) for use in step (i), (2) a device that is capable of generating an oscillating magnetic field for use in step (ii) and (3) a device that is capable of detecting the intensity of the thermoluminescence for use in step (iii).

In one aspect of the apparatus, (1) and (3) may be combined in a single unit. In this case, the apparatus may further comprise (4) an optical fiber which is connected to the single unit and is capable of providing the marking with actinic radiation from (1) and of providing (3) with thermoluminescence emitted by the marking.

BRIEF DESCRIPTION OF THE DRAWINGS

The present invention is further described in the detailed description which follows, in reference to the drawings wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

As used herein, the singular forms "a." "an," and "the" include the plural reference unless the context clearly dictates otherwise. For example, reference to "a superparamagnetic material" would also mean that mixtures of two or more superparamagnetic materials can be present unless specifically excluded.

Except where otherwise indicated, all numbers expressing quantities of ingredients, reaction conditions, etc. used in the instant specification and appended claims are to be understood as being modified in all instances by the term "about." Accordingly, unless indicated to the contrary, the numerical parameters set forth in the specification and claims are approximations that may vary depending upon the desired properties sought to be obtained by the present invention. At the very least, each numerical parameter should be construed in light of the number of significant digits and ordinary rounding conventions.

Additionally, the disclosure of numerical ranges within this specification is considered to be a disclosure of all numerical values and ranges within that range. For example, if a range is from about 1 to about 50, it is deemed to include, for example, 1, 7, 34, 46.1, 23.7, 50 or any other value or range within the range.

The various embodiments disclosed herein can be used separately and in various combinations unless specifically stated to the contrary.

The present invention features the concurrent use of a superparamagnetic material and a thermoluminescent material for marking, identification and/or authentication purposes. Superparammagnetism is a form of magnetism which appears in small ferromagnetic or ferrimagnetic nanoparticles. In sufficiently small nanoparticles, magnetization can randomly flip direction under the influence of an oscillating magnetic field. In the absence of an external magnetic field, the magnetization of the nanoparticles appears to be on the average zero. In this state, an external magnetic field is able to magnetize the nanoparticles, similarly to a paramagnet. However, their magnetic susceptibility is much larger than that of paramagnets. Superparammagnetism occurs in nanoparticles which are single-domain, i.e. are composed of a single magnetic domain. This is usually the case when the diameter of the nanoparticles is in the range of from 1 nm to 20 nm, depending on the material the nanoparticles consist of. In this condition, the magnetization of the nanoparticles can be considered to be a single giant magnetic moment, the sum of all the individual magnetic moments carried by the atoms of the nanoparticle. When an external magnetic field is applied to an assembly of superparamagnetic nanoparticles, their magnetic moments tend to align along the applied field, leading to a net magnetization.

Thermoluminescence is a form of luminescence that is exhibited by certain crystalline materials, when previously absorbed energy from electromagnetic radiation or other ionizing radiation is re-emitted as light upon heating of the material. In a thermoluminescent material such as a ceramic doped with a transition metal/rare earth metal ion that has been irradiated with actinic radiation such as UV radiation or radiation in the visible range of the electromagnetic spectrum electronic exited states are created. These states are trapped for extended periods of time by imperfections (caused by the dopant) in the crystal lattice, which imperfections interrupt the normal intermolecular or inter-atomic interactions in the crystal lattice. Quantum-mechanically, these states are stationary states which have no formal time dependence; however, they are not stable energetically. Heating the material enables the trapped states to interact with lattice vibrations, to rapidly decay into lower-energy states, causing the emission of photons (radiation) in the process. The intensity of the radiation is dependent on the temperature of the material. If the material is heated at a constant heating rate the intensity of the emitted radiation will first increase with temperature and then decrease again, giving rise to a "glow curve" upon plotting the intensity of the emitted radiation versus the temperature of the thermoluminescent material. The shape and position of the glow curve or part thereof are dependent on the ceramic (host) material (including defects in the material such as, e.g., oxygen vacancies) and its dopant.

According to the present invention, the heating of the doped ceramic material is accomplished indirectly by providing the heat through a superparamagnetic material (e.g., the surface of a surface coated thermoluminescent material) that is subjected to an oscillating magnetic field (and thereby caused to heat up) for a predetermined period of time. The glow curve or part thereof which is obtained by plotting the intensity of the radiation emitted by the thermoluminescent material versus the time of applying the oscillating magnetic field (heating) is dependent not only on the parameters associated with the doped ceramic material but also on the parameters associated with the superparamagnetic material. This makes it possible to use particles which comprise both of these materials for making markings that are almost impossible to duplicate without knowledge of this plurality of parameters.

The composite particle of the present invention comprises at least one superparamagnetic portion distribution of superparamagnetic particles on a surface of a thermoluminescent material and at least one thermoluminescent portion (e.g., a particle or a core or an aggregate of thermoluminescent particles which reproducibly contribute to the "glow curve" of the thermoluminescent material and are in the center of the composite material and the superparamagnetic particles are randomly distributed around the thermoluminescent portion). The thermoluminescent portion preferably comprises (or consists of) one or more (e.g., two or three) doped ceramic materials. In another favorable embodiment, the thermoluminescent portion consists of two (or more) different doped ceramic materials that have two distinct "glow curves". For example, a first doped ceramic material that has a "glow curve" peak centered at 45° C. (as obtained with a heating of 20° C./S) and a second doped ceramic material that has a "glow curve" peak centered at 65° C. The resulting composite particle will provide specific "glow curves" signatures upon an applied oscillating magnetic field and.

The composite particles can be present in the form of a surface coated thermoluminescent material where the surface of the thermoluminescent material is coated with superparamagnetic particles with a certain percentage. Here, surface coated thermoluminescent material with superparamagnetic particles means that the superparamagnetic particles are adsorbed on the surface of the thermoluminescent particle. In this regard it is to be noted that the term "rare earth metal" as used herein and in the appended claims is meant to include Y, Sc, La and the lanthanides (Ce to Lu). In this regard, it is to be appreciated that a composite particle according to the present invention such as a core-shell composite particle does not have to be (substantially) spherical. For example, the composite particle may be of a rod-like shape or any other non-spherical shape, as long as it comprises a superparamagnetic portion (e.g., surface coating) and a thermoluminescent portion (e.g., core, or single particles or aggregates of particles in the center of the composite material). The thermoluminescent material can be a single crystal, or a single particle, of any type of morphology (e.g., spherical, cubic, parallelepiped, etc. . . . ).

The superparamagnetic portion of the composite particle comprises (or consist of) a superparamagnetic material (or combinations of two or more superparamagnetic materials). Examples thereof include iron oxide such as $Fe_3O_4$ (also known as magnetite or ferric oxide), metallic Fe, metallic Co, metallic Ni, metal alloys (e.g., FeCo, FeNi, FePt, SmCo). Preferred are superparamagnetic nanoparticles based upon iron oxide. These are commonly referred to as superparamagnetic iron oxide (SPIO) particles and methods for the fabrication of SPIO nanoparticles is known to those of skill in the art (for example, see Lodhia et al. Development and use of iron oxide nanoparticles (Part I): Synthesis of iron oxide nanoparticles for MRI. Biomedical Imaging and Intervention Journal, 6(2):e12, 2010).

The ceramic material will often comprise, in addition to one or more metals (including main group, transition and/or rare earth metals) and, optionally, B and/or Si, one or more elements selected from O, N, S, P, in particular O, optionally in combination with one or more of S and P. A preferred and non-limiting example of a ceramic material for use in the present invention is $Ga_2O_3$. Another preferred and non-limiting example of a ceramic material for use in the present invention is $CaTiO_3$. Another preferred and non-limiting example of a ceramic material for use in the present invention is $SrAl_2O_4$. Other non-limiting examples of ceramic materials which are suitable for use in the present invention include $Ba_2MgSi_2O_7$, $Ba_2Si_3O_8$, $Ba_2SiO$, $Ba_2ZnSi_2O_7$, $Ba_5Si_8O_{21}$, $BaSi_2O_5$, $BaSiO_3$, $CaGd_2Si_2O_7$, $Li_2CaSiO_4$, $MgSr_2Si_2O_7$, $NaLaSiO_4$, $Y_2SiO_5$, $BaAl_{10}MgO_{17}$, $BaAl_{12}O_{19}$, $BaHfO_3$, $CaHf_3$, $CaAl_2O_4$, $SrAl_2O_4$, $BaAl_2O_4$, $GdSc_2Al_3O_{12}$, $Gd_3Y_3Al_{10}O_{24}$, $La_2O_3$, $LaAlO_3$, $SrHfO_3$, $YAlO_3$, $Ba_2B_5O_9C$, $Ba_2Ca(BO_3)_2$, $Ba_3Gd(BO)_3$, $Ca_4YO(BO_3)_3$, $CaLaB_7O_{13}$, $CaYBO_4$, $GdB_3O_6$, $GdBO_3$, $LaB_3O_6$, $LaBO_3$, $LaMgB_5O_{10}$, $Li_6Gd(BO_3)_3$, $Li_6Y(BO_3)_3$, $LuBO_3$, $ScBO_3$, $YAl_3B_4O_{12}$, $YBO_3$, $AgGd(PO_3)_4$, $Ba_2P_2O_7$, $Ba_3(PO_4)_2$, $Ba_3B(PO_4)_3$, $Ba_3P_4O_{13}$, $Ba_5(PO_4)_3F$, $BaKPO_4$, $BaP_2O_6$, $Ca_5(PO_4)_3F$, $CaBPO_5$, $CeP_5O_{14}$, $CsGd(PO_3)_4$, $CsLuP_2O_7$, $CsYP_2O_7$, $K_3Lu(PO_4)_2$, $KGd(PO_3)_4$, $LuP_2O_7$, $KYP_2O_7$, $LiCaPO_4$, $LiGd(PO_3)_4$, $LuPO_4$, $NaBaPO_4$, $NaGd(PO_3)_4$, $NaLuP_2O_7$, $RbLuP_2O_7$, $RbYP_2O_7$, $Sr_5(PO_4)_3F$, $Gd_2O_2S$, $Gd_2S_3$, $Lu_2S_3$, $La_2O_2S$, $CaSnO_3$, $ZnGa_2O_4$, $MgGa_2O_4$, $CaTiO_3$, $ZnTa_2O_6$.

The doping ions are preferably selected from one or more of $Eu^{2+}$, $Eu^{3+}$, $Dy^{3+}$, $Pr^{3+}$, $Sm^{3+}$, $Tb^{3+}$, $Ce^{3+}$, $Ce^{2+}$, $Er^{3+}$ and $Tm^{3+}$ and/or one or more of $Cu^{2+}$, $Cr^{3+}$, $Mn^{2+}$ and $Ti^{3+}$, $In^{3+}$. Of course, any other rare earth metal ion (e.g., lanthanide ion) and any other metal or transition metal ion or any other may be used as well for the purposes of the instant invention as long as it is capable of providing thermoluminescence in combination with the selected ceramic (host) material. A specific non-limiting example of a doped ceramic material that is suitable for use as the thermoluminescent portion of the composite particle of the present invention is $Ga_2O_3$: $Cr^{3+}$. Another specific non-limiting example of a co-doped ceramic material that is suitable for use as the thermoluminescent portion of the composite particle of the present invention is $CaTiO_3:Pr^{3+}$, $In^{3+}$. Another specific non-limiting example of a co-doped ceramic material that is suitable for use as the thermoluminescent portion of the composite particle of the present invention is $SrAl_2O_4:Eu^{2+}$, $Dy^{3+}$.

The largest (average) dimension (e.g., diameter) of the superparamagnetic particle in the composite particle of the present invention will usually be at least 5 nm, e.g., at least 10 nm, and will usually be not higher than 50 nm, e.g., not higher than 30 nm, not higher than 20 nm, or not higher than 15 nm. The dimension of a single superparamagnetic particle will very often be 7-8 or 20 nm.

For the surface coated thermoluminescent material, the surface will be coated with superparamagnetic particles with a certain percentage, e.g., at least 1% and will usually be not higher than 70%, e.g., not higher than 50%, e.g., not higher than 30%, not higher than 20%, or not higher than 10%. The surface of the thermoluminescent material will very often be coated with 5% to 20% of superparamagnetic particles.

The largest dimension of the thermoluminescent material or core may be from 30 nm to 100 μm, e.g., from 100 nm to 1 μm, more preferably from 150 nm to 500 nm.

In one embodiment of the composite particle of the present invention, the particle additionally comprises a thermoconductive, in particular thermoisolating material that separates the superparamagnetic portion from the thermoluminescent portion (e.g., a thermoluminescent core. For example, the thermoconductive material can be present in the form of a layer between the core and the shell of a core-shell particle or a connector between the superparamagnetic surface and a single or an aggregate of thermoluminescent particles. The thermoconductive material can be a layer between the thermoluminescent central particle and the superparamagnetic particles adsorbed on the surface. In this case, the superparamagnetic particles are adsorbed on the surface of the thermoconductive or thermoisolating material.

The thermoconductive material can be inorganic or organic and is advantageously selected from materials which (1) are thermoconductive, (2) do not interfere with the interaction between an external magnetic field and the superparamagnetic material, (3) are optically transparent for radiation in the UV-Vis and NIR range (so as to not interfere with the excitation of the thermoluminescent material or the emission of radiation by the thermoluminescent material) and preferably, (4) can readily be synthesized by processes such as the sol-gel process. Examples of corresponding materials include inorganic oxides such as, e.g., $SiO_2$ and $TiO_2$ and organic polymers such as, e.g., polymethylmethacrylate. A preferred thermoconductive material for use in the present invention is $SiO_2$. In the case of a silica coating around the total composite particle, tetraethoxysilane may be added to a suspension of the particles, followed by hydrolysis, which results in a suspension of silica-coated composite particles. Other suitable sources of silica include sodium silicate, potassium silicate, lithium silicate, aluminum silicate, zirconium silicate, calcium silicate, and silicic acid. In a preferred embodiment, $SiO_2$ is used for the final coating of the composite material containing both the thermoluminescent portion and the superparamagnetic portion. The final silica coating provides a layer will often be not lower than 5 nm. e.g., not lower than 10 nm, or not lower than 20 nm, and will often (although not necessarily) be not higher than 600 nm, e.g., not higher than 500 nm, not higher than 200 nm, or not higher than 100 nm. The silica coating thus prevents the heat dissipation outside of the particle as provided by superparamagnetic portion.

The (average) thickness of the thermoconductive material, for example if present in the form of a layer between a superparamagnetic portion and a thermoluminescent portion, will often be not lower than 5 nm. e.g., not lower than 10 nm, or not lower than 20 nm, and will often (although not necessarily) be not higher than 600 nm, e.g., not higher than 500 nm, not higher than 200 nm, or not higher than 100 nm.

The presence of the thermoconductive material in the composite particle of the present invention makes it possible to influence the "glow curve" (i.e., the curve obtained by plotting the intensity of radiation emitted by the thermoluminescent material versus the time of subjecting the superparamagnetic material to an oscillating magnetic field) not only by variables associated with the superparamagnetic material (e.g., composition of material and size and number of superparamagnetic particles) and associated with the thermoluminescent material (e.g., composition of ceramic material, nature and concentration of dopant ion(s), size of the material), but also by variables associated with the thermoconductive material (e.g., composition of thermoconductive material, thickness of layer). In particular, since the thermoconductive layer separates the superparamagnetic material (i.e., the heating source) from the thermoluminescent material (the material to be heated) both the thermal conductivity and the thickness of the thermoconductive material will affect the rate at which the thermoconductive material is heated once application of the oscillating magnetic field has commenced and thus, the onset of radiation and the slope of the increase (and decrease) of the intensity of the radiation emitted by the thermoluminescent material.

Figure 1:
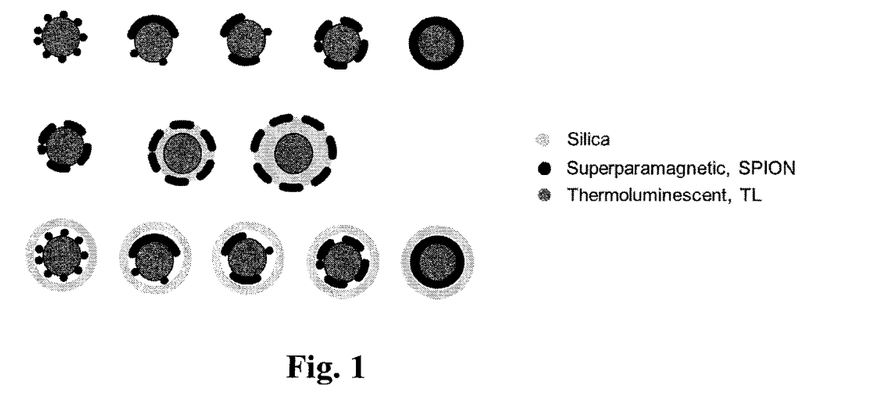
FIG. 1 schematically shows different possible structures of a core-shell composite particle according to the present invention.

FIG. 1 schematically shows several possible structures of a (spherical) core-shell particle according to the present invention. In FIG. 1 the innermost circle represents the thermoluminescent core (dark grey) and the outermost circle represents the superparamagnetic portion (black). The light grey circle, if present, represents the thermoconductive material.

As is apparent from the foregoing, the glow curve and other characteristics of a composite particle according to the present invention can be influenced by a host of variables relating to the superparamagnetic portion, the thermoluminescent portion and, optionally, also to the thermoconductive portion thereof, providing a virtually unlimited number of different particles which are distinguishable based on their properties and in particular, their glow curve upon application of an oscillating magnetic field of predetermined strength and frequency thereto.

Further, if a plurality of composite particles according to the present invention is present (as is the case of a marking), there are even further possibilities of influencing, for example, the glow curve of the thermoluminescent material, thereby increasing the number of possible variations even further. For example, the plurality of particles may comprise two or more kinds of composite particles which differ from each other with respect to at least one of the superparamagnetic material, the doped ceramic material and, optionally, the thermoconductive material used for the production thereof. Alternatively or in addition thereto, the plurality of particles may have been made from the exactly the same materials, but two or more groups of particles may differ with respect to at least one of the (average) size of the superparamagnetic material, the percentage of coating of the thermoluminescent material or core with the superparamagnetic material, the size and chemical nature of the thermoluminescent (e.g., doped ceramic) material and, optionally, the (average) thickness of the thermoconductive material (e.g., layer). Even further, these particles may be present in different particle size distributions. In this regard, it is to be appreciated that due to synthetic constraints, it is not possible to produce particles which have exactly the same dimensions of, e.g., superparamagnetic portion, the thermoluminescent portion and, optionally, the thermoconductive portion. Accordingly, a plurality of composite particles of the present invention will inevitably comprise particles whose respective dimensions are scattered to a certain extent around average values of each parameter (thereby providing a glow curve as an average of the plurality of particles). Merely by way of example, in a given sample of particles the size (diameter) of the core may vary by up to 20%, preferably not more than 10% (for example, 10 nm+/−1 nm), the thickness of the luminescent shell or the aggregate of thermoluminescent particles may vary by up to 35%, preferably not more than 25% (e.g., 20 nm+/−5 nm), and the thickness of a layer of thermoconductive material, if present, may vary by up to 20%, preferably not more than 10% (e.g., 50 nm+/−5 nm).

A marking which comprises a plurality of composite particles of the present invention may be present in many different forms. By way of non-limiting example, the marking may be in the form of at least one of an image, a picture, a logo, indicia, a cloud of dots, randomly distributed dots, one or more glyphs and a pattern representing a code selected from one or more of a 1-dimensional barcode, a stacked 1-dimensional barcode, a 2-dimensional barcode, a 3-dimensional barcode, and a data matrix.

An article which can be provided with a marking of the present invention can be present in many different forms as well. For example, the article may be or may comprise at least one of a label, packaging, a cartridge, a container or a capsule that contains foodstuffs, nutraceuticals, pharmaceuticals or a beverage, a banknote, a credit card, a stamp, a tax label, a security document, a passport, an identity card, a driver's license, an access card, a transportation ticket, an event ticket, a voucher, an ink-transfer film, a reflective film, an aluminum foil, and a commercial good.

An ink which can be used for making a marking of the present invention can be any ink that is suitable for making a marking on an article and comprises a plurality of composite particles as set forth above and allows the detection of thermoluminescence. The ink may also comprise additional components which can be used for identification/authentication purposes, as long as these components do not interfere with the detection of radiation and in particular, thermoluminescence emitted by the composite particles.

The method of making (providing an article with) the marking of the present invention is not limited, as long as it can accommodate an ink which contains the composite particles of the present invention.

The marking of the present invention may, for example, be formed by digital printing. However, the marking may also be formed by a conventional printing method or any other method that allows the production of a marking. An exemplary method for producing the marking is ink-jet printing (for example, continuous ink-jet printing, drop-on-demand ink-jet printing, or valve-jet printing). The industrial ink-jet printers, commonly used for numbering, coding and marking applications on conditioning lines and printing presses, are particularly suitable for this purpose. Preferred ink-jet printers include single nozzle continuous ink-jet printers (also called raster or multi level deflected printers) and drop-on-demand ink-jet printers, in particular valve-jet printers. Other conventional techniques such as offset, rotogravure, screen printing, letterpress, flexography, intaglio, etc. can also be used and are known by the skilled on in the art.

A method of identifying and/or authenticating an article that has been provided with a marking according to the present invention may comprise the following steps:

(i) irradiating the marking with (preferably electromagnetic) radiation (e.g., radiation in the UV or visible range of the electromagnetic spectrum) to cause the composite particles to emit radiation at a wavelength that is characteristic for the thermoluminescent portion;

(ii) subjecting the irradiated marking to an oscillating magnetic field of predetermined strength (e.g., in the range of from 1 G to 1000 G or even lower, depending on the specific material used for the superparamagnetic core and the size thereof) and predetermined frequency (e.g., in the range of from 1 kHz to 1 MHz, preferably from 1 kHz to 500 kHz or even lower, depending on the specific material and size of the superparamagnetic core) for a predetermined period of time (e.g., in the range of from 30 ms to 30 s) to cause the superparamagnetic material to heat up; and (iii) detecting the intensity of the thermoluminescence emitted by the marking at a predetermined wavelengths range during the predetermined period of time of step (ii) to obtain the variation of the intensity of the thermoluminescence as a function of time ("glow curve")

(iv) Optionally, detecting the intensity of the thermoluminescence emitted by the marking at a predetermined wavelengths range for 1 or several specific durations of applied oscillating magnetic field; e.g., detecting intensity at to (before applying the oscillating magnetic field), detecting the intensity at $t_1$ (e.g., after 10 ms of applied oscillating magnetic field), detecting the intensity at $t_2$ (e.g., after 100 ms of applied oscillating magnetic field), detecting the intensity at $t_3$ (e.g., after 1 s of applied oscillating magnetic field), detecting the intensity at $t_4$ (e.g., after 2 s of applied oscillating magnetic field), etc.

(v) optionally after step (iii) pursuing the detection of the luminescence intensity after the magnetic field is switched off.

(vi) Optionally, the UV (or visible) light used for excitation in (i) can be turned off prior (ii) subjecting the irradiated marking to an oscillating magnetic field.

In order to reach the magnetic field strength mentioned above over a surface where the marking has been applied (without being able to access both sides of the surface), it is required to have a special configuration of the magnet. This represents a difficulty which can be solved by using a torroidal magnet with a very small air gap to allow the fringing magnetic field to penetrate the marking on the surface and to reach the necessary magnetic field strength. In this preferred configuration, the small size of the air gap represents a complication for the irradiation and also for the collection of the radiated thermoluminescence. That would require the use of a complex optical scheme, with micro lenses and mirrors in order to irradiate efficiently through the small air gap and also to collect enough thermoluminescence signal.

The predetermined wavelengths range at which the thermoluminescence (and optionally also the radiation emitted in step (i)) is detected depends on the doping ion(s) and the ceramic (host) material. For example, if the material is $Ga_2O_3:Cr^{3+}$ the thermoluminescence will usually be detected at 720+/−10 nm, whereas when the material is $CaSnO_3$:Tb the thermoluminscence will usually be detected at 550+/−10 nm. In another embodiment, the intensity of the radiation can also be measured in a region of wavelengths that is on a whole range of the visible and/or NTR spectrum. For example, the intensity of the radiation can be measured from 400 nm to 700 nm, or from 450 nm to 800 nm, or from 500 to 750 nm. The detection is performed with standard silicon photodiode.

In a preferred embodiment, the method of the present invention may further comprise a comparison of the variation of the intensity of the thermoluminescence obtained in step (iii) with the variation of the intensity of the thermoluminescence of composite particles used for making the marking (i.e., a reference sample) that had previously been determined under conditions identical to those used in steps (i) and (ii). If the variations are identical, this is a very strong indication, if not conclusive evidence, that the marking is the original marking (i.e., has not been duplicated).

In another preferred embodiment, the method may further comprise the determination of the intensity of the radiation emitted in step (i) at the predetermined wavelengths range. For example, the intensity of the radiation in step (i) may be compared to the intensity of the radiation emitted by the composite particles used in the marking (reference sample) that had previously been determined on a reference sample under identical conditions, preferably in the form of the ratio of the intensity of the radiation emitted in step (i) and the intensity of the radiation emitted after a fixed point in time after the commencement of the application of the oscillating magnetic field. If the ratios are identical, this is further evidence that the marking is the original marking. An apparatus for carrying out the method of the present invention may comprise a radiation source for use in step (i) such as, e.g. a lamp that emits radiation in the UV and/or visible range, a device for generating an oscillating magnetic field for use in step (ii), and a device for detecting the intensity of the thermoluminescence for use in step (iii) (and optionally also the intensity of the re-emitted radiation in step (i)).

In a preferred embodiment of the apparatus, the source of radiation and the device for detecting the intensity of radiation emitted by the marking are combined in a single unit. This makes it possible to use a single device such as a single optical fiber which is connected to the unit and is capable of providing the marking with radiation from the source of radiation and of providing the detection device with the thermoluminescence emitted by the marking (the composite particles of the present invention). The use of an optical fiber allows to solve the problem of limited accessibility of the optical measurement area located within the very small air gap need to produce the required magnetic field strength on the marking surface as explained above.

Figure 2:
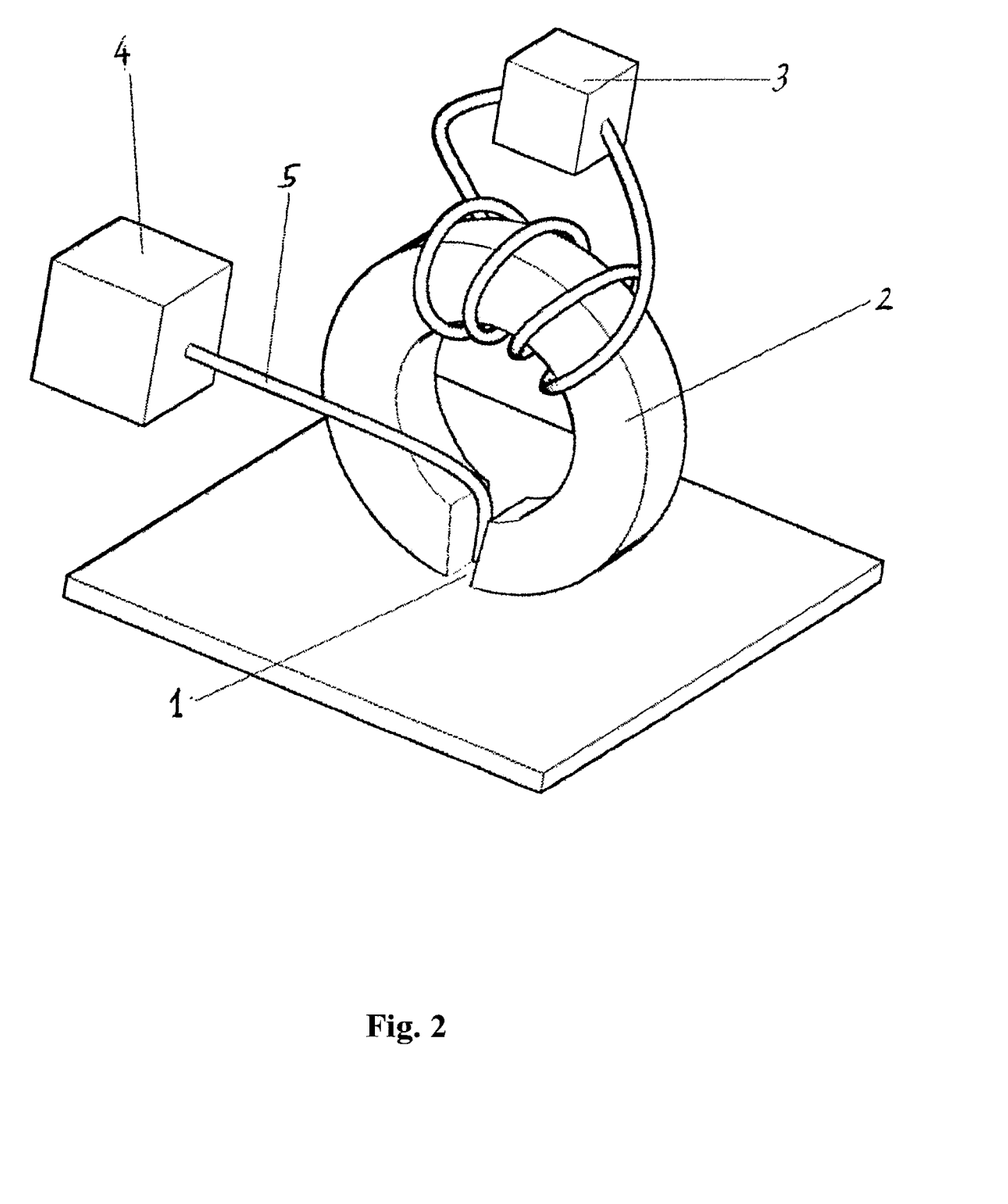
FIG. 2 schematically shows an apparatus for use in a method according to the present invention.

FIG. 2 schematically shows an apparatus for carrying out the method of the present invention. In FIG. 2, reference numeral 1 represents the marking comprising the composite particles of the present invention, 2 represents a magnet with the small air gap located onto the marking to be authenticated, 3 represents an alternating current generator, 4 represents a combined irradiation and detection unit for radiation emitted by the marking and 5 represents a (single) optical fiber which transmits radiation to and from the unit 4 and permit to access the measurement zone through the small air gap.

It is noted that the foregoing examples have been provided merely for the purpose of explanation and is in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims. The synthesis of the composite particle follows the bottom-up approach, whereas the building blocks (superparamagnetic iron oxide nanoparticles and thermoluminescent part) are synthesized separately and are integrated together via electrostatic interactions and sol-gel synthesis.

Superparamagnetic iron oxide nanoparticles with controlled diameters can be obtained via well established procedures as described in:

*Journal of Nanomaterials*, 2013, *Article ID* 752973, Hiroaki Mamiya, Recent Advances in Understanding Magnetic Nanoparticles in AC Magnetic Fields and Optimal Design for Targeted Hyperthermia

*International Journal of Molecular Sciences*, 2013, 14, 15910-15930, Reju Thomas and al., Magnetic Iron Oxide Nanoparticles for Multimodal Imaging and Therapy of Cancer Thèse no 5694 (2013) EPFL, Usawadee Sakulkhu, Preparation of coated nanoparticles and investigation of their behavior in biological environment.

*Journal of Colloid and Interface Science* 278, 353-360 (2004), Chastellain, M., Petri, A. & Hofmann, H. Particle size investigations of a multistep synthesis of PVA coated superparamagnetic nanoparticles.

*Biomaterials* 26, 2685-2694 (2005), Petri-Fink, A., Chastellain, M., Juillerat-Jeanneret, L., Ferrari, A. & Hofmann, H. Development of functionalized superparamagnetic iron oxide nanoparticles for interaction with human cancer cells.

Superparamagnetic iron oxide nanoparticles can also be purchased from Sigma Aldrich.

If necessary, superparamagnetic core coated with a silica layer is obtained via the well-known sol-gel synthesis, as described in:

*Advanced Materials*, 2013, 25, 142-149, Wei Li and Dongyuan Zihao, Extension of the Stöber Method to Construct Mesoporous SiO2 and TiO2 Shells for Uniform Multifunctional Core-Shell Structures Thermoluminescent particles are mainly obtained by hydrothermal synthesis followed by a calcination step, whereas the hydrothermal step allows for a well-controlled morphology of the thermoluminescent particles, while the calcination step is important for the crystallinity and the thermoluminescent properties. The synthesis of thermoluminescent materials can also be performed via solid-state synthesis. The synthesis of thermoluminescent materials is well established, and can be found in the following literature:

*Chemical Engineering Journal*, 239, (2014), 360-363, K. Sue et al., Ultrafast hydrothermal synthesis of Pr-doped $Ca_{0.6}Sr_{0.4}TiO_3$ red phosphor nanoparticles using corrosion resistant microfluidic devices with Ti-lined structure under high-temperature and high-pressure conditions.

*Journal of Alloys and Compounds* 415, (2006), 220-224, C. Chang, Z. Yuan and D. Mao, $Eu^{2+}$ activated long persistent strontium aluminate nano scaled phosphor prepared by precipitation method.

Below is a list of other publications describing in detail the synthesis of the thermoluminescent building blocks:

Powder Technology, 237, 2013, 141-146

Spectrochimica Acta Part A: Molecular and Biomolecular Spectroscopy 127, 2014, 256-260

Materials 2010, 3, 2536-2566

Materials 2013, 6, 2789-2818

Electrostatic and other weak interactions enable adsorption of superparamagnetic particles on the surface of the thermoluminescent particles. In this case, SPIONs, previously synthesized, are adsorbed on the thermoluminscent particles. The assembly of the two parts, thermoluminescent and superparamagnetic part, is performed in aqueous solution at a pH where the surface of one part is at least partially negatively charged and the surface of the other part is at least partially positively charged. The surface charges of the separate building blocks (thermoluminescent part and superparamagnetic part) are previously determined with zeta potential measurements. It is possible to increase the electrostatic interaction between the superparamagnetic particles and the thermoluminescent particle by functionalizing the superparamagnetic-silica surface with (3-aminopropyl) triethoxysilane (APTES), leading to a positively charged surface SPION-silica and by coating with a thin layer of silica the previously synthesized nano sized thermoluminescent particle. The last provides a negatively charged surface of the thermoluminescent part due to the OH groups of surface silanols, and thus favors the adsorption of the superparamagnetic particles onto the thermoluminescent core. The total core-shell particles are coated with a thin layer of silica. This layer enables further functionalization of the surface for desired applications and maintains the heat transfer within the total composite particle. The silica precursor is tetraethyl orthosilicate (TEOS) and the catalyst is a base such as ammonia ($NH_4OH$). Parameters such as, precursor concentration, catalyst concentration, solvent, temperature, pH, agitation and reaction duration, are controlled in order to produce homogeneously distributed nano engineered particles.

The assembly of superparamagnetic particles onto the surface of the thermoluminescent core is based on electrostatic interactions at a certain pH. In order to select the optimal pH at which the assembly will take place, it is useful to measure the zeta potential of the surface of the two different particles in function of pH. If the charges on the surface of the building blocks are too similar, it is possible to modify one surface by chemical functionalization in order to have well distinguished positively and negatively charged building blocks at a given pH. The chemical functionalization can consist of amino groups for positively charged surfaces, or carboxylic groups for negatively charged surfaces.

The coupling between the superparamagnetic building block and the thermoluminescent building block is in the origin of the invention. The choice of the superparamagnetic particle (for example $Fe_3O_4$ with diameter of 20 nm), and the adsorbed quantity of SPIONs on the surface (for example 15% of the thermoluminescent core surface) of the thermoluminescent particle will provide a certain heating rate under a given oscillating magnetic field. On the other hand, the choice of the thermoluminescent material will provide a specific thermoluminescent curve (glow curve), with a luminescence centered at a specific wavelength. It is important to select a thermoluminescent material, whose luminescence can be stimulated with the heating rate provided by the oscillating magnetic field and the superparamagnetic building block.

For example, we have experimentally measured that 15% of SPIONS adsorbed on $CaTiO_3:Pr^{3+}$ (0.14%), $In^{3+}$ (1%) of dimension 200 nm×100 nm×100 nm (parallelepiped), coated with a thin layer of silica, will provide a glow curve after an initial UV excitation centered at 300 nm during 5 min and within the first 5 seconds of the oscillating magnetic field of several miliTesla with an oscillation of 1 MHz. We have also experimentally confirmed that it is possible to extract the glow curve parameters if the initial UV excitation is switched OFF before subjecting the marking to the oscillating magnetic field or also if the UV excitation is kept ON while subjecting the marking to the oscillating magnetic field. The particularity in the glow curve parameters is that the intensity provided by the thermoluminescent material as measured with a standard silicon photodiode increases for a certain time after subjecting the marking to the oscillating magnetic field. The intensity increase is followed by an intensity decrease, thus simulating a glow curve. The glow curve parameters can be the slope of the increase of intensity, the maximum intensity level, etc., . . . .

Figure 7:
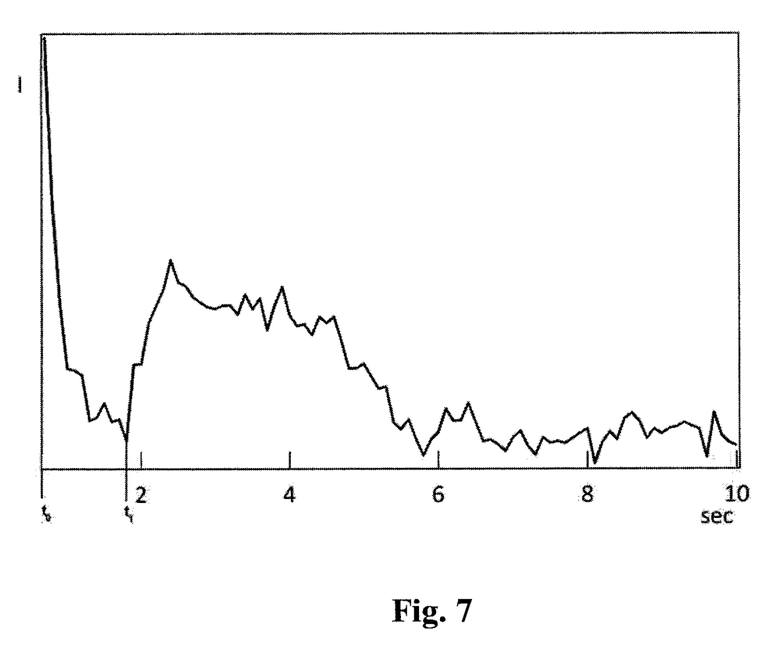
FIG. 7 shows the experimental result of a thermoluminescence curve of particles according to a preferred embodiment of the invention stimulated with an oscillating magnetic field FIG. 8 a) shows the thermoluminescence curve of similar particles as used for the experiments resulting in FIG. 7 stimulated differently and FIG. 8b) shows an enlarged section of the curve of FIG. 8a)

In FIG. 7 the experimental result of a thermoluminescence curve (intensity of luminescence I over time t) of the mentioned material stimulated with an oscillating magnetic field as described is shown. The experiments were conducted with an irradiance of about 10 mW/cm²=100 W/m² for 5 min. The excitations are consecutive, i.e. first the UV excitation was set ON, and then once the UV excitation was set OFF, the magnetic field oscillation is set ON. The magnetic field oscillation is set immediately after the extinction of the UV excitation (t0). In the beginning, just after extinction of the UV light, the intensity of luminescence starts to decrease. At a time t1, the intensity of luminescence starts to increase. This is due to thermoluminescence, which starts at that point of time. Once all energy stored in the thermoluminescent material has been externalized via luminescence, the luminescence intensity decreases back to zero. The time between the turning the magnetic field oscillation ON and t1 is specific to the composite particle. One the one hand, it depends on the amount and size of SPION in the composite particle and on the other hand it depends on the chemical nature of the thermoluminscent particle, and in particular its glow curve. The time elapsed between t0 and t1 represents the time necessary for the heat generated by the magnetic part of the particle to be transferred to the thermoluminescent part and the last starts to thermoluminescence. For a given amount of SPION, and a given magnetic field oscillation, the time elapsed between t0 and t1 will be higher for thermoluminescent materials that have a maximum peak of the glow curves centered at higher temperatures.

Figure 8A:
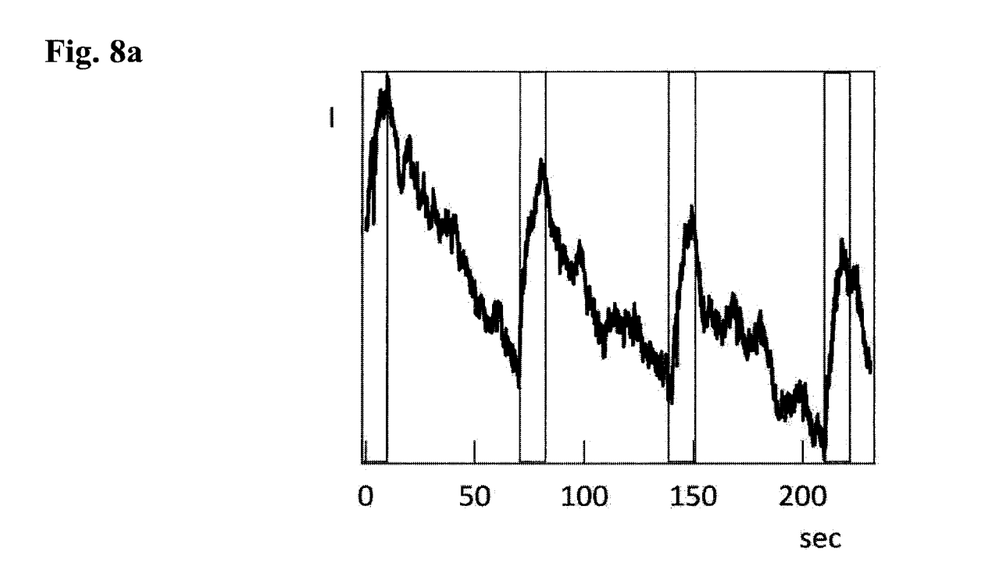
Figure 8B:
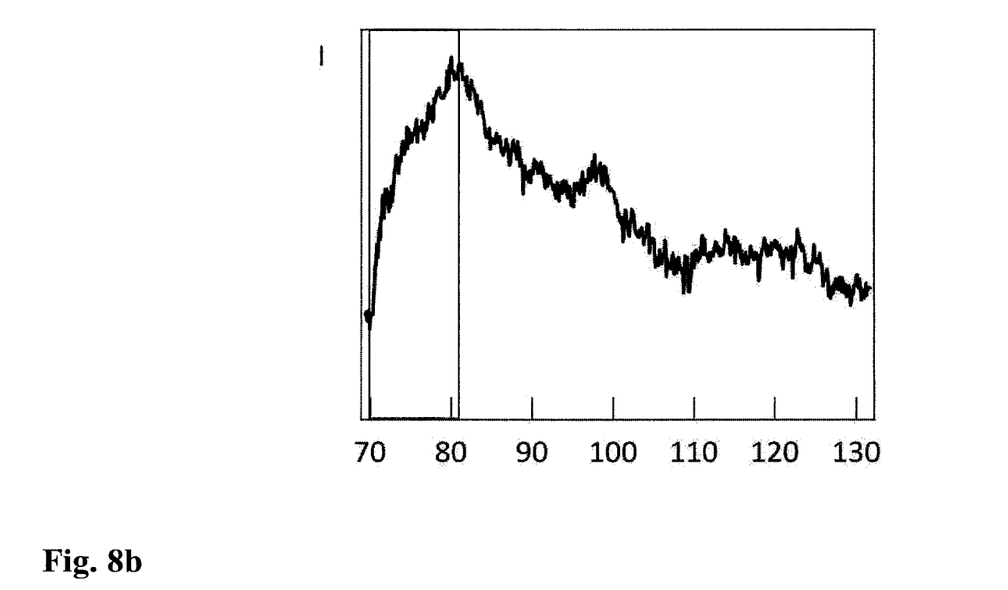

FIG. 8 a) shows the thermoluminescence curve of the same material as used for the experiment described above. In this example UV excitation was set ON continuously with pulses of oscillating magnetic field (between 0-10 s, 70-80 s, 140-150 s, 210-220 s). FIG. 8b) shows an enlarged section of the curve of FIG. 8a). As long as the magnetic field is pulsed ON a simultaneous dual excitation is visible. This results in an increase of the luminescence intensity This is a second method for authentication. The magnetic generator used for this experiment is an Inductive Heaters PowerCube of CEIA and it was regulated at 10% of its power. When the magnetic generator is turned OFF, the luminescence intensity starts to decrease. At this time two processes takes place simultaneously in the composite particle. The local cooling down of the particle and the excitation of the particle with the UV light. After turning ON the magnetic generator for a second pulse, the luminescence intensity increase again.

Figure 9A:
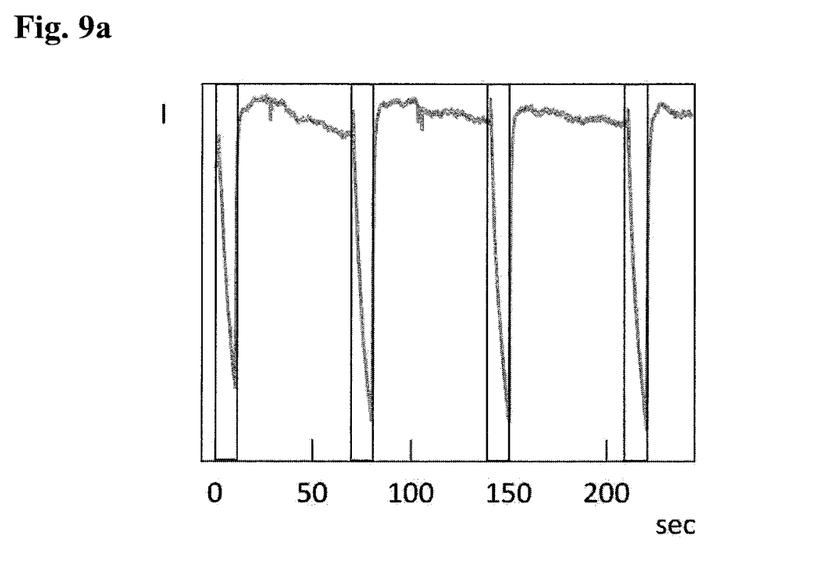
FIG. 9a) shows the curve of the same experiment as in FIG. 8a) with a higher magnetic field and FIG. 9b) shows an enlarged section of the curve of FIG. 9a)
Figure 9B:
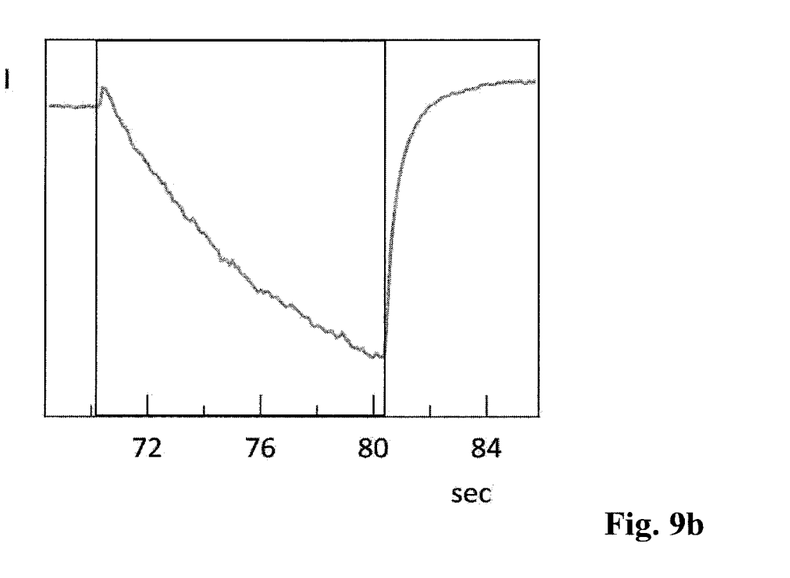

FIG. 9a) and b) shows the curve of the same experiment as in FIG. 8a) with the difference, that the magnetic field was ten times higher, i.e. 100% of power of magnetic generator used. In this example, the specificity of the composite particle is observed in the very first instants when the magnetic heating is turned ON. At that time, there is an initial increase of the luminescence intensity that is due to thermoluminescence, however, very quickly, the intrinsic temperature within the particle becomes too high which results with a decrease in luminescence intensity. This is a common behavior for luminescent materials that are out of the thermoluminescent regime, the decrease of luminescence intensity with increase of temperature. In this example the specific part of the curve is the moment right after the turning ON of the magnetic field oscillation when we are still in the thermoluminescent regime.

The invention claimed is:
1. A composite particle for use in a marking, comprising:
a thermoluminescent core consisting of two or more ceramic materials, each of the two or more ceramic materials doped with at least one ion selected from metal ions, transition metal ions and rare earth metal ions;
a thermoconductive layer that covers the thermoluminescent core and comprises one or more of $SiO_2$, $TiO_2$, polymethylmethacrylate; and
a superparamagnetic material being in the form of aggregated or single superparamagnetic particles distributed over a surface of the thermoconductive layer, wherein the superparamagnetic particles cover 1% to 70% of the surface of the thermoconductive layer;
wherein each of the two or more ceramic materials is selected from the following: $Ba_2MgSi_2O_7$, $Ba_2Si_3O_8$, $Ba_2SiO$, $Ba_2ZnSi_2O_7$, $Ba_5SisO_{21}$, $BaSi_2O_5$, $BaSiO_3$, $CaGd_2Si_2O_7$, $Li_2CaSiO_4$, $NaLaSiO_4$, $BaAl_{10}MgO_{17}$, $BaAl_{12}O_{19}$, $BaHfO_3$, $CaHf_3$, $GdSc_2Al_3O_{12}$, $Gd_3Y_3Al_{10}O_{24}$, $SrHfO_3$, $YAlO_3$, $Ba_2B_5O_9Cl$, $Ba_2Ca(BO_3)_2$, $Ba_3Gd(BO)_3$, $Ca_4YO(BO_3)_3$, $CaLaB_7O_{13}$, $CaYBO_4$, $GdB_3O_6$, $GdBO_3$, $LaB_3O_6$, $Li_6Gd(BO_3)_3$, $Li_6Y(BO_3)_3$, $LuBO_3$, $ScBO_3$, $YAl_3B_4O_{12}$, $AgGd(PO_3)_4$, $Ba_2P_2O_7$, $Ba_3(PO_4)_2$, $Ba_3B(PO_4)_3$, $Ba_3P_4O_{13}$, $Ba_5(PO_4)_3F$, $BaKPO_4$, $BaP_2O_6$, $Ca_5(PO_4)_3F$, $CaBPO_5$, $CeP_5O_{14}$, $CsGd(PO_3)_4$, $CsLuP_2O_7$, $CsYP_2O_7$, $K_3Lu(PO_4)_2$, $KGd(PO_3)_4$, $LuP_2O_7$, $KYP_2O_7$, $LiCaPO_4$, $LiGd(PO_3)_4$, $LuPO_4$, $NaBaPO_4$, $NaGd(PO_3)_4$, $NaLuP_2O_7$, $RbLuP_2O_7$, $RbYP_2O_7$, $Sr_5(PO_4)_3F$, $Gd_2S_3$, $Lu_2S_3$, and $CaSnO_3$, each doped with the at least one ion selected from $Eu^{2+}$, $Eu^{3+}$, $Dy^{3+}$, $Pr^{3+}$, $Sm^{3+}$, $Tb^{3+}$, $Ce^{3+}$, $Ce^{2+}$, $Er^{3+}$, $Tm^{3+}$, $Cr^{3+}$, $Mn^{2+}$, $Ti^{3+}$, and $In^{3+}$;

$CaTiO_3$ doped with $Pr^{3+}$ and $In^{3+}$; and $Ga_2O_3$ doped with $Cr^{3+}$;

wherein the two or more doped ceramic materials are selected such that they provide distinct glow curves, wherein a glow curve of each of the two or more doped ceramic materials is obtained by plotting an intensity of radiation emitted by the ceramic material versus time of applying an oscillating magnetic field to the superparamagnetic material of the composite particle.

2. The composite particle according to claim 1, wherein the whole composite particle is coated with a silica layer.

3. The composite particle according to claim 2 wherein the silica layer coating has a thickness of not lower than 5 nm and not higher than 600 nm.

4. A marking which comprises a plurality of composite particles according to claim 1.

5. The marking according to claim 4, wherein at least a part of the marking is in the form of at least one of an image, a picture, a logo, indicia, a cloud of dots, randomly distributed dots, one or more glyphs and a pattern representing a code selected from one or more of a 1-dimensional barcode, a stacked 1-dimensional barcode, a 2-dimensional barcode, a 3-dimensional barcode, a data matrix.

6. An article having thereon the marking according to claim 4.

7. The article of claim 6, wherein the article is or comprises at least one of a label, packaging, a cartridge, a container or a capsule that contains foodstuffs, nutraceuticals, pharmaceuticals or a beverage, a banknote, a credit card, a stamp, a tax label, a security document, a passport, an identity card, a driver's license, an access card, a transportation ticket, an event ticket, a voucher, an ink-transfer film, a reflective film, an aluminum foil, and a commercial good.

8. An ink for making a marking, wherein the ink comprises a plurality of composite particles according to claim 1 and a carrier for the composite particles.

9. A method of providing an article with a marking, wherein the method comprises using the ink according to claim 8 providing the marking.

10. A method of at least one of identifying and authenticating an article provided with a marking according to claim 4, wherein the method comprises the following steps:

(i) irradiating the marking with radiation to cause the composite particles to emit radiation;

(ii) subjecting the irradiated marking of step (i) to an oscillating magnetic field of predetermined strength and frequency for a predetermined period of time to cause the superparamagnetic material to heat up; and (iii) detecting the intensity of the thermoluminescence emitted by the marking at a predetermined wavelengths range during the period of time applied in step (ii) to obtain the variation of the intensity of the thermoluminescence as a function of time.

11. The method according to claim 10, wherein the method further comprises comparing the variation of the intensity of thermoluminescence obtained in (iii) with the variation of the intensity of the thermoluminescence of a reference sample that had previously been determined under conditions identical to those used in steps (i) and (ii).

12. The method according to claim 10, wherein the method further comprises determining the intensity of the radiation re-emitted in step (i).

13. The method according to claim 12, wherein the method further comprises comparing the intensity of the radiation re-emitted in step (i) to the intensity of the radiation re-emitted by the reference sample that had previously been determined under identical conditions.

14. An apparatus for carrying out the method according to claim 10, wherein the apparatus comprises a radiation source for use in step (i), a device capable of generating an oscillating magnetic field for use in step (ii) and a device capable of detecting the intensity of the thermoluminescence for use in step (iii).

15. A process for marking objects, substrates and/or supports by inkjet printing via the continuous deflected jet technique, by spraying an ink according to claim 8 onto these objects.

16. The composite particle according to claim 1 wherein one ceramic material of the two or more ceramic materials is $CaTiO_3$ doped with $Pr^{3+}$ and $In^{3+}$ with concentrations of $Pr^{3+}$ and $In^{3+}$ in $CaTiO_3$ being 0.14% for $Pr^{3+}$ and 1% for $In^{3+}$.

17. The composite particle according to claim 1 wherein one ceramic material of the two or more ceramic materials is $Ga_2O_3$ doped with $Cr^{3+}$.

18. The composite particle according to claim 1 wherein the thermoconductive layer comprises polymethylmethacrylate.

19. The composite particle according to claim 1 wherein the superparamagnetic particles cover 5% to 20% of the surface of the thermoconductive layer.

* * * * *